United States Patent [19]

Drew et al.

[11] Patent Number: 4,595,427
[45] Date of Patent: Jun. 17, 1986

[54] ANNEALING PROCESS CONTROL METHOD AND APPARATUS

[75] Inventors: Robin A. L. Drew, Montreal; Wilson B. Muir, Sutton; William M. Williams, Westmount, all of Canada

[73] Assignee: The Royal Institution for the Advancement of Learning (McGill University), Montreal, Canada

[21] Appl. No.: 663,410

[22] Filed: Oct. 22, 1984

[51] Int. Cl.$^4$ ............................................. C21D 11/00
[52] U.S. Cl. ...................................... 148/129; 266/78; 266/87; 266/90
[58] Field of Search .................. 148/128, 129; 266/87, 266/90, 78–80, 91

[56] References Cited

U.S. PATENT DOCUMENTS

| 2,059,054 | 10/1936 | Stargardter | 148/129 |
| 3,130,363 | 4/1964 | Camp et al. | 324/34 |
| 3,496,033 | 2/1970 | Gilbreath, Jr. et al. | 148/13 |
| 3,596,891 | 8/1971 | Hill | 263/52 |
| 4,409,042 | 10/1983 | Dornberger et al. | 148/129 |

OTHER PUBLICATIONS

Journal of Physics, 1980, vol. 11, pp. 1337–1345, P. Hautojarvi, J. Johannson, A. Vehanen, J. Yli-Kauppila, P. Girard and C. Minier.
Physics Status Solidi, 1978, vol. 48, pp. 551–554, M. L. Johnson, S. Saterlie, D. Boice and J. G. Byrne.
Solid State Communications, 1978, vol. 27, pp. 1219–1222, G. Dlubek, O. Brümmer and N. Meyendorf.
Solid State Communications, 1979, vol. 29, pp. 597–599, G. Dlubek, O. Brümmer and A. Alam.
Metallurgical Transactions, "Differential Resistivity Measurement for Monitoring Annealing", Drew, Muir and Williams, vol. 14A, Feb. 1983, pp. 175–182.
Journal of Physics E: Scientific Instruments, 1976, vol. 9, pp. 163–164 "A Sensitive AC Difference Method for Electron Transport Measurements", Muir and Strom-Olsen.
Journal of Physics E: Scientific Instruments, 1982, vol. 15, pp. 425–428, Cochrane, Kastner and Muir, "A Low-Power AC Differential Ohm-Meter".

Primary Examiner—Christopher W. Brody
Attorney, Agent, or Firm—Schwartz, Jeffery, Schwaab, Mack, Blumenthal & Evans

[57] ABSTRACT

A method and an arrangement for following and controlling the progress of heat treatment of cold worked metals in an annealing furnace uses the changing electrical resistivity of the cold worked metal during the annealing process as a process control parameter. A sample of the cold worked metal is placed in a slave furnace along with a sample of the cold worked metal which has been previously annealed. The temperature of the slave furnace is controlled to follow and duplicate the temperature at any point of interest in the annealing furnace, and the differential resistivity between the two samples is measured to follow and control the progress of annealing.

8 Claims, 5 Drawing Figures

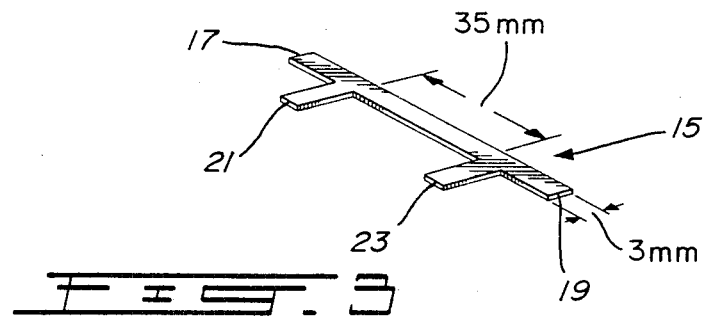
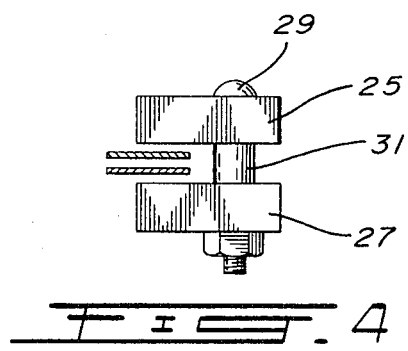
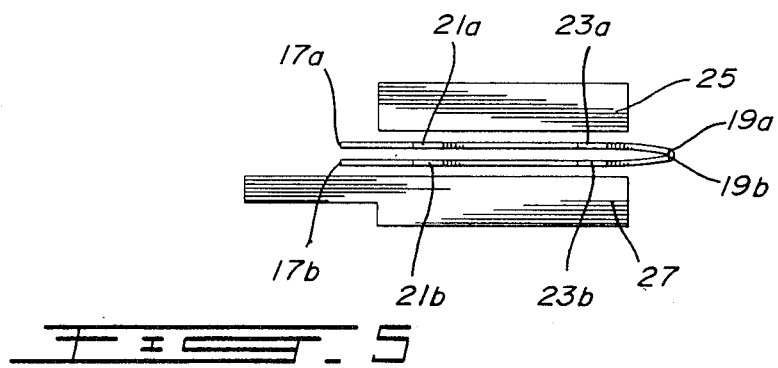

ANNEALING PROCESS CONTROL METHOD AND APPARATUS

BACKGROUND OF INVENTION

1. Field of the Invention

The invention relates to a method for following and controlling the progress of annealing during heat treatment of cold worked metals, and an arrangement for carrying out the method. More specifically, the invention relates to such a method and arrangement which uses the changing electrical resistivity of the cold worked metal during annealing as a process control parameter.

2. Description of Prior Art

Present annealing cycles, which are applied to a variety of metals and alloys, particularly steels, are based on past experience and post-process control methods such as mechanical testing and metallography. Such cycles do not allow for corrections during the actual annealing process itself. When the annealing of cold worked metals is followed and analyzed using, for example, hardness measurements, optical and electron metallography, density, X-ray diffraction and positron annihilation as described, for example, in P. Hautojarvi, J. Johannson, A. Vehanen, J. YliKauppila, P. Girard, and C. Minier: J. Phys. F., 1980, vol. 11, pp. 1337–45.; M. L. Johnson S. Saterlie, D. Boice, and J. G. Byrne: Phys. Status Solidi, 1978, vol. 48, pp. 551–54.; G. Dlubek, O. Brümmer, and N. Meyendorf: Solid State Commun., 1978, vol. 27, pp. 1219–22.; and G. Dlubek, O. Brümmer, and A. Alam: Solid State Commun., 1979, vol. 29, pp. 597–99., there is usually a requirement for sophisticated apparatus. In addition, these methods are either difficult or impossible to use for monitoring during annealing so that corrections cannot be made during annealing.

SUMMARY OF INVENTION

It is therefore an object of the invention to provide a method and arrangement which overcomes the difficulties of the prior art.

It is a still further object of the invention to provide a method and apparatus which can be used during the annealing process itself whereby it becomes possible to monitor annealing.

In accordance with the invention, the control parameter which is monitored is the electrical resistivity of the cold worked metal being annealed. In a preferred arrangement, a sample of the cold worked metal being annealed is monitored in a slave furnace whose temperature is controlled to follow the temperature of the annealing furnace. Preferably, a sample of the cold worked metal and a sample of the cold worked metal which has been previously annealed are both placed in the slave furnace and the differential resistivity is measured.

BRIEF DESCRIPTION OF DRAWINGS

The invention will be better understood by an examination of the following description, together with the accompanying drawings in which:

FIG. 3 illustrates one embodiment of a typical sample;

FIGS. 4 and 5 are end and side views respectively of one embodiment of an electrical resistivity probe.

DESCRIPTION OF PREFERRED EMBODIMENTS

Figure 1:
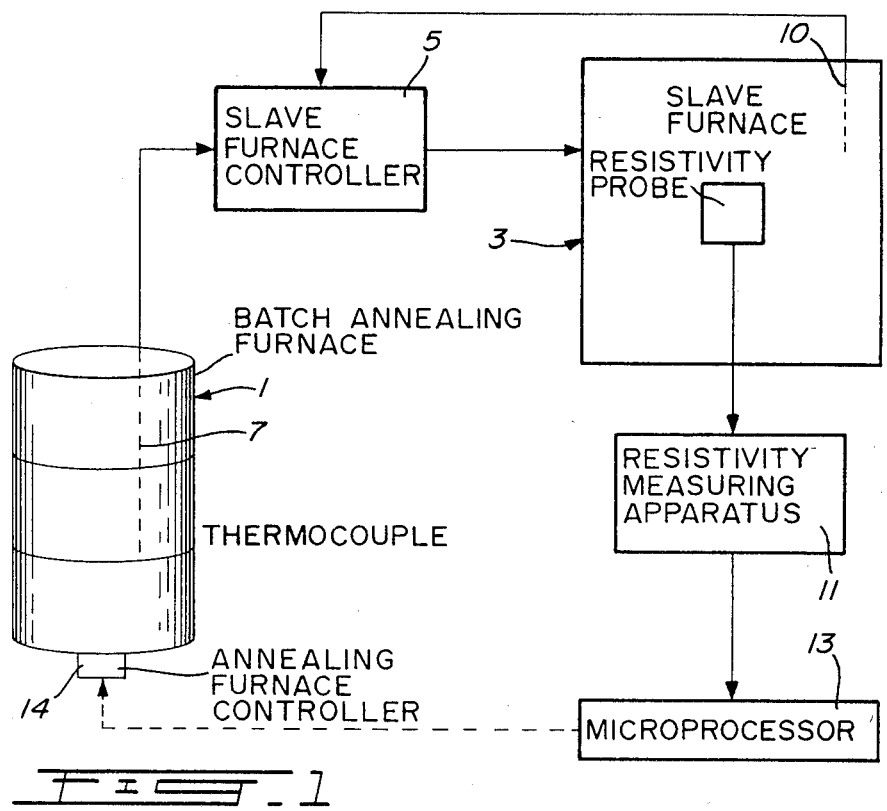
FIG. 1 is a schematic diagram illustrating the inventive method and arrangement.

Referring to FIG. 1, the inventive method and arrangement are used in association with a batch annealing furnace 1. The arrangement includes a slave furnace 3 and a slave furnace controller 5. Thermocouple means 7, comprising one or more thermocouples, are disposed in the annealing furnace at the points of interest, e.g., the coldest location or the center of a metal coil, and the output of the thermocouple is fed to the slave furnace controller. The output of the slave furnace controller is, in turn, fed to the slave furnace to control the temperature thereof. Specifically, the temperature of the slave furnace is controlled by the slave furnace controller to follow the temperature in the annealing furnace, e.g., to duplicate the time-temperature cycle in the annealing furnace.

Disposed in the slave furnace is a resistivity probe 9. As will be seen below, the resistivity probe includes a sample of the cold worked metal which is being annealed in the annealing furnace.

As will also be seen below, the resistivity of the sample is measured by the resistivity measuring apparatus 11, and the output of the resistivity measuring apparatus 11 is fed to a microprocessor 13 for processing the measurements. The output of the microprocessor may be fed back to the annealing furnace controller 14 to control its operation.

Also disposed in the slave furnace is a second thermocouple means 10 to measure the temperature in the slave furnace. The output of 10 is fed back to the slave furnace controller 5 to provide feedback control maintaining the temperature of the slave furnace at the same level as the temperature in the annealing furnace.

Figure 2:
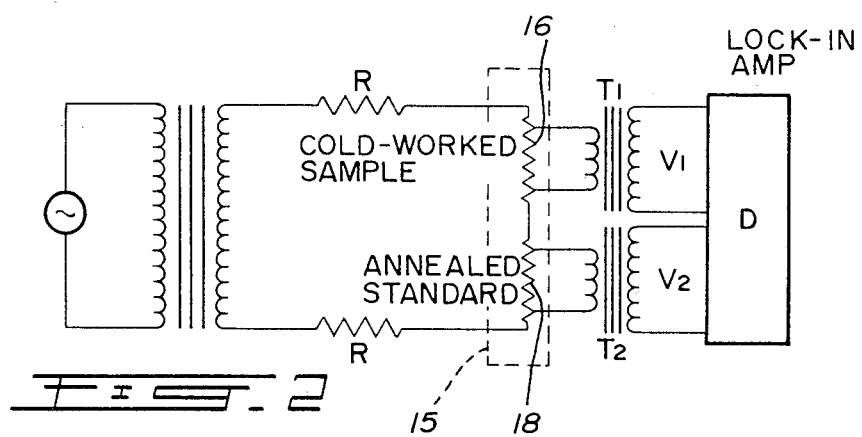
FIG. 2 is a circuit diagram illustrating the electrical resistivity probe and the electrical resistivity measuring apparatus.

Referring now to FIG. 2, the resistivity probe 15 comprises a sample of the cold worked material 16 and an annealed standard (that is, a sample of the cold worked material which has been previously annealed) 18 connected in electrical series. The two samples are disposed in close proximity so that the temperatures of the samples are the same. The sample and the standard are also connected in series with two resistors R which are current limiting resistors.

The voltage across the cold worked sample is fed to a lock-in amplifier D via transformer $T_1$, while the voltage across the annealed standard is fed to the lock-in amplifier D by the transformer $T_2$.

The operation of the circuit of FIG. 2 is explained in Differential Resistivity Measurement for Monitoring Annealing, Drew, Muir and Williams, Metallurgical Transactions, Vol. 14A, February 1983, Pgs. 175–182. (See also A Sensitive AC Difference Method for Electron Transport Measurements, Muir and Strom-Olsen, Journal of Physics E: Scientific Instruments 1976, Volume 9, Pgs. 163–164 and A Low-Power AC Differential Ohm-Meter, Cochrane, Kastner and Muir, Journal of Physics E: Scientific Instruments, 1982, Volume 15, Pgs. 425–428).

As seen in FIG. 3, a sample comprises an elongated member having elongated extensions 17 and 19 which serve as current terminals, and lateral extensions 21 and 23 which serve as voltage terminals. The annealed standard will have the identical shape and dimensions as the cold worked sample.

Referring now to FIGS. 4 and 5, the probe will comprise plates 25 and 27 which are held together by bolt or the like 29 which is encircled by a spacer 31 between the two plates. Terminal 19a of the sample 17a is soldered or otherwise electrically connected to like terminal 19b of the standard 17b whereby to provide the series arrangement as shown in FIG. 2.

In operation, the arrangement is as follows:

The cold worked metal to be annealed is disposed in the furnace 1 as well known in the art, and a thermocouple is located in the furnace to measure the temperature inside the furnace at a point of interest. A sample of the cold worked metal, and a like-shaped, like-sized standard (i.e., a sample of the cold worked metal which has been previously annealed), are prepared to form the resistivity probe as illustrated in FIGS. 3 to 5, and the resistivity probe is placed in circuit with the measuring apparatus as illustrated schematically in FIG. 2.

The temperature in the slave furnace is maintained at the same temperature as the temperature in the annealing furnace by means of the slave furnace controller with the feedback arrangement as above described.

The differential resistivity of the resistivity probe is measured, and the measurement is fed to the microprocessor, which provides an input to the annealing furnace controller 14, whereby to follow and control the progress of the annealing process.

Although a single embodiment has been illustrated, this was for the purpose of describing, but not limiting, the invention. Various modifications, which will come readily to the mind of one skilled in the art, are within the scope of the invention as defined in the appended claims.

We claim:

1. An arrangement for following and controlling the progress of annealing during heat treatment of cold worked metals which heat treatment is carried out in an annealing furnace;
   said arrangement comprising:
   a slave furnace;
   a slave furnace controller connected to said slave furnace to control the temperature thereof;
   means for measuring the temperature in said annealing furnace;
   said means for measuring the temperature in said annealing furnace being connected to said slave furnace controller to provide information concerning the temperature of said annealing furnace to said slave furnace controller, whereby to control the temperature of said slave furnace to follow the temperature of said annealing furnace;
   a sample arrangement including a shaped segment of said cold worked material and a standard comprising a separate like shaped segment of said cold worked material which has been previously annealed, the two segments being of equal size and being disposed in close proximity, said sample arrangement being disposed in said slave furnace;
   means for measuring the differential resistivity between said shaped segment and said standard;
   annealing furnace controller means for controlling the temperature of said annealing furnace;
   said means for measuring the differential resistivity being connected to said annealing furnace controller whereby to follow and control the progress of annealing.

2. An arrangement as defined in claim 1, wherein said means for measuring the temperature in said annealing furnace comprises thermocouple means.

3. An arrangement as defined in claim 2, and further including means for measuring the temperature of said slave furnace and for feeding back said measurement to said slave furnace controller whereby to control the temperature of the slave furnace to follow the temperature of said annealing furnace.

4. An arrangement as defined in claim 3, wherein said means for measuring the temperature of said slave furnace comprises second thermocouple means.

5. A method for following and controlling the progress of annealing during heat treatment of cold worked metal in an annealing furnace using an arrangement which includes a slave furnace, and a sample arrangement including a shaped segment of said cold worked material and a standard comprising a separate like shaped segment of said cold worked material which has been previously annealed, the two segments being of equal size and being disposed in close proximity;
   said method comprising:
   measuring temperature in said annealing furnace and controlling the temperature of said slave furnace to follow the temperature of said annealing furnace;
   measuring the differential resistivity between said shaped segment and said standard;
   controlling the temperature of said annealing furnace in accordance with said differential resistivity measurement;
   whereby to follow and to control the progress of annealing.

6. A method as defined in claim 5 wherein the step of measuring the temperature in the annealing furnace is performed with thermocouple means in the annealing furnace.

7. A method as defined in claim 6 wherein the step of controlling the temperature of the slave furnace to follow the temperature of the annealing furnace is performed with a slave furnace controller connected, at the input thereof, to said thermocouple means, and, at the output thereof, to said slave furnace.

8. A method as defined in claim 7 and including the further step of providing feedback from said slave furnace to said slave furnace controller.

* * * * *